United States Patent
Khan et al.

(10) Patent No.: US 8,278,243 B2
(45) Date of Patent: Oct. 2, 2012

(54) LASER IMAGING

(75) Inventors: Nazir Khan, Nottingham (GB); Martin Robert Walker, Cheshire (GB)

(73) Assignee: Datalase Ltd., Widnes (GB)

(*) Notice: Subject to any disclaimer, the term of this patent is extended or adjusted under 35 U.S.C. 154(b) by 1176 days.

(21) Appl. No.: 10/584,121

(22) PCT Filed: Jan. 14, 2005
(Under 37 CFR 1.47)

(86) PCT No.: PCT/GB2005/000121
§ 371 (c)(1),
(2), (4) Date: Feb. 4, 2009

(87) PCT Pub. No.: WO2005/068207
PCT Pub. Date: Jul. 28, 2005

(65) Prior Publication Data
US 2010/0075848 A1  Mar. 25, 2010

(30) Foreign Application Priority Data
Jan. 14, 2004 (GB) .................................. 0400813.2

(51) Int. Cl.
*B41M 5/24* (2006.01)

(52) U.S. Cl. ......... 503/201; 503/202; 503/210; 503/218

(58) Field of Classification Search .................. 503/201, 503/202, 210, 218
See application file for complete search history.

(56) References Cited

U.S. PATENT DOCUMENTS

| | | | | |
|---|---|---|---|---|
| 4,849,396 A | * | 7/1989 | Satake et al. | 503/210 |
| 4,861,620 A | | 8/1989 | Azuma et al. | |
| 5,489,639 A | * | 2/1996 | Faber et al. | 524/417 |
| 5,626,966 A | * | 5/1997 | Kulper et al. | 428/423.1 |
| 5,717,018 A | | 2/1998 | Magerstedt et al. | |
| 6,444,068 B1 | | 9/2002 | Koops et al. | |
| 6,627,299 B1 | | 9/2003 | Feng et al. | |
| 7,485,403 B2 | * | 2/2009 | Khan | 430/270.1 |
| 2003/0180660 A1 | | 9/2003 | Khan | |
| 2005/0231585 A1 | * | 10/2005 | Mudigonda et al. | 347/238 |

FOREIGN PATENT DOCUMENTS

| | | |
|---|---|---|
| EP | 0 697 433 A | 2/1996 |
| EP | 0 867 466 A1 | 9/1998 |
| EP | 1 110 660 A2 | 6/2001 |
| EP | 1279517 A2 * | 1/2003 |
| JP | 2530233 B2 * | 9/1996 |
| JP | A-2001-219387 | 8/2001 |
| WO | WO 02/068205 A1 | 9/2002 |
| WO | WO 02074548 A2 * | 9/2002 |
| WO | WO 2004/043704 A1 | 5/2004 |
| WO | WO 2004/045857 A2 | 6/2004 |

OTHER PUBLICATIONS

Machine translation of JP 2530233 acquired on Oct. 21, 2011.*
Machine translation of EP 1279517 acquired on Oct. 21, 2011.*

* cited by examiner

*Primary Examiner* — Gerard Higgins
(74) *Attorney, Agent, or Firm* — Saliwanchik Lloyd & Eisenschenk

(57) ABSTRACT

An ink formulation comprises a marking component and a metal salt that absorbs laser irradiation at 700-2000 mn and thereby causes the marking component to change colour. A copper salt in particular allows effective marking with a diode or $CO_2$ laser.

7 Claims, No Drawings

LASER IMAGING

This application is a National Stage Application of International Application Number PCT/GB2005/000121, filed Jan. 14, 2005; which claims priority to British Application No. 0400813.2, filed Jan. 14, 2004.

FIELD OF THE INVENTION

This invention relates to laser imaging.

BACKGROUND OF THE INVENTION

WO02/068205, WO02/074548, WO2004/043704 and PCT/GB2004/003219, and also corresponding patent applications claiming the same priority dates, including U.S. patent applications Ser. Nos. 10/344,393 and 10/380,381 (the content of each of which is incorporated herein by reference), describe laser imaging and also materials that can be used for that purpose. Examples that are provided typically involve the use high energy lasers.

There are many attractions in using non-contact near-IR sources, in particular diode lasers, to generate images from coatings for applications such as variable information packaging. Favourable attributes of diode lasers such as economy, portability and ease of use, are attractive for current needs in the packaging industry, such as in-store labelling.

By incorporating, into ink formulations, materials which absorb radiation from far-IR to mid-IR sources such as heat (~1 to 20 μm) and $CO_2$ laser (~10 μm), coatings have been produced which will generate a distinct coloured image on exposure to this wavelength of energy but not near-IR sources. By incorporating, into these same ink formulations, materials which absorb radiation from near-IR sources such as diode lasers (~1 μm), coatings have been produced which will generate a distinct coloured image on exposure to near, mid or far-IR irradation.

Copper salts have been previously used (see U.S. Pat. No. 5,840,791A, US20030191223A and US20020016394A) as "laser light-active" compounds. They have been utilised in thermoplastic polymer mouldings, thermoplastic resin and thermoplastic polymer powder compositions etc., for laser marking of plastic components. Inorganic copper salts such as copper (II) hydroxy phosphate, copper (II) pyrophosphate and copper (II) sulphate, and organic copper salts such as copper (II) fumarate, copper (II) maleate and copper (II) oxalate, are known.

SUMMARY OF THE INVENTION

The invention utilizes a metal salt as a functional IR-absorber/colour developer material which, on absorption of radiation from a laser source, can directly produce a colour-forming reaction when in combination with a component that will otherwise undergo the desired reaction on irradiation at a higher wavelength. For example, it can be used in combination with an oxymetal anion component in an applied coating, to generate a distinct coloured image. Alternatively, a colour-forming component is used, to generate a distinct image.

According to this invention, the potential of utilizing diode and $CO_2$ lasers for imaging applications on, for example, of packaging can be realized. It has been shown that, by the application of liquid film-forming inks onto various substrates to produce coatings capable of distinct colour change, exposure to near-IR sources produces good results dependent primarily on the formulation of the ink.

DESCRIPTION OF PREFERRED EMBODIMENTS

An essential component for use in the present invention is one or more metal salts. A preferred metal is copper. Other suitable salts are of monovalent or multivalent metals, e.g., a transition metal such as Fe or Zn. Poly-metal salts may also be used. They are characterized by the presence of two or more metal centres in oxide compounds and can typically be composed of a number of different transition metals and their oxides. For instance, a copper and molybdenum or copper and tungsten oxide binary metal salt will provide a single molecule diode laser imaging coating where an external near-IR absorber is not required. Thus, a near-IR absorber and a marking component are combined within the same molecule and in practice are retained intimately intact within individual discrete particles of the coating. In an embodiment, an ink formulation can include a marking component and a metal salt that absorbs laser irradiation at 700-2000 nm thereby causing the marking component to change colour.

The IR absorber should be compatible with the colour change chemistry, have no or minimal absorption in visible region of the absorption spectrum, and be an efficient absorber of 800-2000 nm (preferred λmax around 1000 nm). Preferably the IR absorber is inorganic in nature. It should have thermally stability greater then 200° C. and good light stability and weatherability. It should be colourless or impart minimal colour in the finished coating formulation. Further preferred features of the IR absorber are that it should be water-stable, have minimal solubility in water, be compatible with water-based binders/compatible with common organic solvents, environmentally friendly, readily available and non toxic.

Particularly suitable copper salts (which will be given below only for illustration) may be one or more of a range of materials, for example, copper (II) hydroxyl phosphate or copper (II) pyrophosphate. Suitable poly-metal salts are, for example, copper (II) molybdenum oxide, copper (II) tungsten oxide and others such as iron (III) molybdenum oxide and iron (III) tungsten oxide. A suitable ink formulation may comprise 1-50, e.g. 1-10% w/w of the salt.

More generally, and using copper as an example, the following may be used, as salts having near-IR absorbing properties:

copper (II) phthalocyanines (various) e.g. A,B,C,D-tetrakis (pyridiniomethyl) Cu(II) phthalocyanine chloride, copper(II) 1,2,3,4,8,9,10,11,15,16,17,18,22,23,24,25-hexadecafluoro-29h,31h-phthalocyanine, copper(II) 5,9,14,18,23,27,32,36-octabutoxy-2,3-naphthalocyanine, copper(II) 5,9,14,18,23, 27,32,36-octabutoxy-2,3-naphthalocyanine, copper(II) 1,4, 8,11,15,18,22,25-octabutoxy-29h,31h-phthalocyanine, copper(II) 2,3,9,10,16,17,23,24-octakis(octyloxy)-29h,31h-phthalocyanine, copper(II) phthalocyanine, copper(II) phthalocyanine-tetrasulfonic acid tetrasodium salt, copper phthalocyanine-3,4',4", 4'''-tetrasulfonic acid, tetrasodium salt, copper(II) 4,4',4", 4'''-tetraaza-29h,31h-phthalocyanine, copper(II) 2,9,16,23-tetra-tert-butyl-29h,31h-phthalocyanine, copper(II) 3,10,17,24-tetra-tert-butyl-1,8,15,22-tetrakis (dimethylamino)-29h,31h-phthalocyanine, copper(II) tetrakis(4-cumylphenoxy)phthalocyanine, poly(copper phthalocyanine), copper(II) 2,3-naphthalocyanine, copper phthalocyanine rayon, Avecia Projet 830 NP, Projet 900 NP, Projet 825 LDI, Projet 830 LD, copper (II) hydroxide phosphate, copper (II) pyrophosphate hydrate, copper (II) acetate, copper (II) acetate hydrate, copper (II) hydroxide carbonate (copper carbonate basic), copper (II) acetyl acetonate, copper (II) pyrophosphate hydrate, copper (II) acetate hydrate, copper (II) formate tetrahydrate, copper (II) d-gluconate tetrahydrate, copper (II) oxalate hemihydrate, copper (II) acrylate, copper (II) benzene sulphinate hydrate, copper (II) bis(6,6,7,7,8,8-heptafluoro-2,2-dimethyl-3,5-dioctanedionate), copper (II) bis(2,2,6,6-tetramethyl-3,5-heptanedionate), copper (II) citrate, copper(II) bromide, copper (II) chloride, copper (II) chloride dihydrate, copper (II) fluoride, copper(II) fluoride hydrate, copper (II) iodate, copper (II) cyclohexanebutyrate, copper (II) 3,5-diisopropylsalicylate hydrate, copper (II) 2-ethylhexanoate, copper (II) hexafluoroacetylacetonate hydrate, copper (II) hydroxide, copper (II) isopropoxide, copper (II) methacrylate, copper (II) methacryloxyethylacetoacetate, copper (II) methoxide, copper (II) nitrate hydrate, copper (II) oxide, copper (II) perchlorate hexahydrate, copper (II) 2-pyrazinecarboxylate, copper (II) stearate, copper (II) sulphate hydrate, copper (II) tartrate hydrate, copper (II) tetrafluoroborate hydrate, copper (II) trifluoroacetate hydrate, copper (II) trifluoroacetylacetonate, copper (II) trifluoromethanesulphonate, alpha-(5-chloro-2-pyridylimino)-o-cresol copper(II) salt, alpha-(3,5-dichloro-2-pyridylimino)-o-cresol copper (II) salt, alpha-(3-methyl-2-pyridylimino)-o-cresol copper(II) salt, alpha-(4-methyl-2-pyridylimino)-o-cresol copper(II) salt, alpha-(6-methyl-2-pyridylimino)-o-cresol copper(II) salt, alpha-(2-pyridylimino)-o-cresol copper(II) salt, ammonium tetrachlorocuprate(II) dihydrate, (9-anthrylethynyl)copper, copper disodium bathocuproinedisulfonate, benzenethiol copper(I) salt, benzoic acid, copper (II) salt dihydrate, 2-benzothiazolylacetylene copper (I) salt, bis(ethylenediamine)copper(II) hydroxide, Bis(2-methoxy-6-(4-methyl-2-pyridyliminomethyl)phenolato) copper, [bis(trimethylsilyl)acetylene](hexafluoroacetylacetonato)copper(I), bis(triphenylphosphine)copper(I) borohydride, ((4-bromophenyl)-thio)-copper(I), bromotris(triphenylphosphine)copper(I), chlorophyllin sodium copper salt, chlorotris(triphenylphosphine)copper(I), copper(I) acetate, copper bis(6,6,7,7,8,8-heptafluoro-2,2-dimethyl-3,5-octanedionate), copper bis(2,2,6,6-tetramethyl-3,5-heptanedionate), copper(I) bromide, copper(I) bromide-dimethyl sulfide complex, copper(I) bromide methylsulfide complex, copper(I) 1-butanethiolate, copper(I) chloride, copper(I) chloride 1,5-cyclooctadiene complex, copper(I) cyanide, copper(II) cyclohexanebutyrate, copper(II) 3,5-diisopropylsalicylate hydrate, copper(II) di(2-naphthoate), copper (II) 2-ethylhexanoate, copper(II) heptadecanoate palmitate, copper(II) hydroxyfluoride, copper(I) iodide, copper(I) iodide trimethylphosphite complex, copper naphthenate, copper(II) nitrate hemi(pentahydrate), copper(II) nonadecanoate stearate, copper(I) oxide, copper oxychloride, copper (II) perchlorate hexahydrate, copper(II) phosphate dihydrate, copper(II) 2-pyrazinecarboxylate, copper(I) sulfide, copper (II) sulfide, copper(II) tetrafluoroborate hydrate, copper(I) thiocyanate, copper(I) thiophenolate, copper(II) trifluoroacetate hydrate, copper(II) trifluoroacetylacetonate, copper(II) trifluoromethanesulfonate, copper(I) trifluoromethanesulfonate-benzene complex, copper(I) trifluoromethanesulfonate toluene complex, copper-2(3)-9(10)-16(17)-23(24)-tetramethyl-2(3)-9(10)-16(17)-23-(24)-tetra-azoniaphthaloeyanine tetrakis (methanosulfate), dibromo(1,10-phenanthroline)copper(H), dichloro(n-(2-pyridylmethylene)aniline-N,N)copper(II), diethylenetriamine-pentaacetic acid copper(II) trisodium salt, di-µ-hydroxo-bis(N,N,N',N'-tetramethylethylenediamine)copper(II) chloride, 1,8-dihydroxy-2-nitroso-3,6-naphthalenedisulfonic acid copper complex, (N,N'-diisopropylacetamidinato)copper(I), ((3,4-dimethoxyphenyl)ethynyl)copper, dinitrato(1,10-phenanthroline)copper(II), ethyl alpha-acetyl-3-(fluorosulfonyl)benzoylacetate, copper(II), ethyl alpha-acetyl-3-(methoxycarbonyl)benzoylacetate, copper(II), ethyl alpha-acetyl-4-(methoxycarbonyl)benzoylacetate, copper (II), ethyl benzoylacetate, copper(II), ethyl 2-chlorobenzoylacetate, copper(II), (ethylcyclopentadienyl)(triphenylphosphine)copper(I), ethylenediaminetetraacetic acid copper(II) disodium salt, ethyl 2-fluorobenzoylacetate, copper(II), ethyl 3-(fluorosulfonyl)benzoylacetate, copper(II), ethyl 2-(4-(pentyloxy)benzoyl)acetate, copper(II), 3-(fluorosulfonyl)benzoic acid, copper(II) salt, hydrido(triphenylphosphine)copper(I) hexamer, 2-(1-hydroxyethylidene)-1-cyclopentanone, copper(II) complex, 8-hydroxyquinoline copper(II) salt, iodo(trimethyl phosphite)copper(I), pontamine copper blue, methyl acetoacetate copper(II), methyl 3-oxoeicosanoate copper(II), 2-nitro-5,10,15,20-tetraphenyl-21h,23h-porphine copper(II), 2,3,7,8,12,13,17,18-octaethyl-21h,23h-porphine copper(II), oleic acid, copper(II) salt, 1-phenyl-3-(2-thienyl)-1,3-propanedione, copper(I) derivative, phthalic acid copper(II), salt, N-pyruvylideneglycinato(aquo)copper(II) dihydrate, tetraamminecopper(II) sulfate monohydrate, tetrakis(acetonitrile)copper(I) hexafluorophosphate, 5,10,15,20-tetraphenyl-21h,23h-porphine copper(II), triphenylphosphine-copper(I) hydride hexamer, tris(ethylenediamine)copper(II) sulfate, calcoloid copper brown and others.

Copper minerals may also be used, such as ajoite, antlerite, arsentsumerite, arthurite, atacamite, aurichalcite, azurite, bayoldonite, boleite, bornite, bournonite, brass, brochantite, buttgenbachite, calciovolborthite, calcdonite, chalcanthite, chalcocite, chalcophyllite, chalcopyrite, chalcosiderite, chalcotrichite, chrysocolla, clinoclase, conichalcite, connellite, cornetite, covellite, cubanite, cumensite, cuprite, cuproadamite, cuprosklodowskite, cyanotrichite, diaboleite, dioptase, domeykite, duftite, Emplectite, enargite, graemite, kinoite, knaufite, kolwezite, ktenasite, libethenite, linarite, liroconite, malachite, meta-torbernite, meta-zeunerite, mixite, mottramite, olivenite, papagoite, plancheite, polybasite, pseudoboleite, pseudomalachite, quetzalcoatlite, rosasite, shattuckite, spangolite, tennantite, tetrahedrite, torbernite, tsumebite, turquoise, veszelyite, volborthite, zeunerite and others.

Other suitable metal salts for near-IR absorbing include compounds of aluminium, boron, cadmium, cobalt, gallium, indium, iron, lithium, lead, magnesium, manganese, nickel, silicon, silver, sodium, tin, titanium, vanadyl and zinc. Examples include aluminium 2,3-naphthalocyanine chloride, aluminium 1,4,8,11,15,18,22,25-octabutoxy-29h3 lhphthalocyanine triethylsiloxide, aluminium phthalocyanine chloride, aluminium phthalocyanine hydroxide, aluminium 1,8,15,22-tetralcis(phenylthio)-29h,31h-phthalocyanine chloride, aluminium 2,9,16,23-tetralcis(phenylthio)-29h,31h-phthalocyanine chloride, aluminium 2,9,16,23-tetralcis(phenylthio)-29h,31h-phthalocyanine chloride, aluminium 1,8,15,22-tetraphenoxy-29h,31h-phthalocyanine chloride, aluminium 2,9,16,23-tetraphenoxy-29h,31 h-phthalocyanine chloride, chloroaluminium chlorophthalocyanine and others.

Further suitable compounds are boron sub-2,3-naphthalocyanine chloride, boron subphthalocyanine chloride and others, and cadmium phthalocyanine and others. Suitable cobalt compounds include cobalt(II) phthalocyanine, cobalt(II) 2,3-naphthalocyanine, cobalt(II) 1,2,3,4,8,9,10,11,15,16,17,18,22,23,24,25-hexadecafluoro-29h,31h-phthalocyanine, ammonium cobalt(II) sulfate hexahydrate, N,N'-bis[3-tert-butyl-5-(heptadecafluorooctyl)salicylidene]-trans-1,2-cyclohexanediamino-cobalt(II), bis(cyclopentadienyl)cobalt (II), bis(cyclopentadienyl)cobalt(III) hexafluorophosphate, (R,R)-(−)-N,N'-bis(3,5-di-tert-butylsalicylidene)-1,2-cyclohexanediaminocobalt(II), (S,S)-(+)-N,N'-bis(3,5-di-tert-butylsalicylidene)-1,2-cyclohexanediaminocobalt(II), [1,2-bis(diphenylphosphino)ethane]dichlorocobalt(II), (1,1'-bis(diphenylphosphino)ferrocene)dichlorocobalt(II), bis(ethylcyclopentadienyl)cobalt(II), bis(ethylcyclopentadienyl)cobalt(III) hexafluorophosphate, bis(pentamethylcyclopentadienyl)cobalt(II), bis(pentamethylcyclopentadienyl)cobalt(III) hexafluorophosphate, bis(1,2,3-propanetriyltriammine)cobalt(III) iodide, bis(salicylaldehyde)cobalt(II), N,N-bis(salicylidene)ethylenediaminocobalt(II), N,N-bis(salicylidene)-1,2-phenylenediaminocobalt(II) hydrate, bis(salicylideniminato-3-propypmethylaminocobalt(II), cobalt(II) acetate, cobalt(II) acetylacetonate, cobalt(III) acetylacetonate, cobalt(II) benzoylacetonate, cobalt boride, cobalt(II) bromide, cobalt(II) carbonate hydrate, cobalt carbonyl, cobalt(II) chloride, cobalt(II) cyanide dehyrate, cobalt(II) 2-ethylhexanoate, cobalt(II) fluoride, cobalt(III) fluoride, cobalt(II) hexafluoroacetylacetonate hydrate, cobalt(II) hydroxide, cobalt(II,III) oxide, cobalt(II) iodide, cobalt naphthenate, cobalt(II) nitrate hexahydrate, cobaltocene, cobalt(II) oxalate dehydrate, cobalt(II) oxide, cobalt(III) oxide, cobalt(II) perchlorate hexahydrate, cobalt(II) phosphate hydrate, cobalt(II) sepulchrate trichloride, cobalt(II) stearate, cobalt(II) sulfate heptahydrate, cobalt(II) tetrafluoroborate hexahydrate, cobalt(II) thiocyanate, cobalt tris(2,2,6,6-tetramethyl-3,5-heptanedionate), trans-dichlorobis(ethylenediamine)cobalt(III) chloride, dichlorobis(triphenylphosphine)cobalt(II), trans-dinitrobis(ethylenediamine)cobalt(III) nitrate, hexaamminecobalt(III) nitrate, hexammine cobalt(III) chloride, mercury(II) tetrathiocyanatocobaltate(II), 2,3,7,8,12,13,17,18-Octaethyl-21h,23h-porphine cobalt(II), pentaamminecarbonatocobalt(III) nitrate hemihydrate, pentaamminechlorocobalt(III) chloride, potassium hexacyanocobaltate(III), potassium hexacyanocobalt(II)-ferrate(II), protoporphyrin IX cobalt chloride, sodium cobalticarborane, sodium hexanitrocobaltate(III), tetraethylammonium tetrabromo-cobaltate(II), tetraethylammonium tetrachloro-cobaltate(II), 5,10,15,20-tetrakis(4-methoxyphenyl)-21h,23h-porphine cobalt(II), 5,10,15,20-tetraphenyl-21h,23h-porphine cobalt(II), meso-tetraphenylporphyrin cobalt(II) complex, trans-dichlorotriethylenetetraaminecobalt(III) chloride, tris(ethylenediamine)cobalt(III) chloride dehydrate, tris(ethylenediamine)cobalt(III) nitrate, tris(ethylenediamine)cobalt(III) sulfate and others.

Yet further compounds are gallium(III) 2,3-naphthalocyanine chloride, gallium(III)-phthalocyanine chloride, gallium(III) phthalocyanine hydroxide and others, and indium(III) phthalocyanine chloride and others.

Suitable iron compounds includen iron phthalocyanine compounds eg. iron(II) 1,2,3,4,8,9,10,11,15,16,17,18,22,23,24,25-hexadecachloro-29h,31h-phthalocyanine, iron phthalocyanine, iron(II) phthalocyanine bis(pyridine) complex, iron(III) phthalocyanine chloride, dichlorotetrakis(pyridine) iron, (S)-(+)-acetyl-cyclopentadienyl-iron carbonyl triphenylphosphine complex, iron(III) phthalocyanine-4,4',4'',4'''-tetrasulfonic acid, compound with oxygen monosodium salt hydrate, black iron oxide, red iron oxide, yellow iron oxide, acetylferrocene, (aminomethyl)-phosphonic acid iron (II) salt, ammonium iron(III) citrate, ammonium iron(III) oxalate trihydrate, ammonium iron(III) sulfate dodecahydrate, ammonium iron(II) sulfate hexahydrate, ammonium iron(III) sulfate, benzenecyclopentadienyliron(II) hexafluorophosphate, benzoylferrocene, bis(N,N'-di-tert-butylacetamidinato)iron(II), bis(dicarbonyl(methylcyclopentadienyl) iron), [1,2-bis(diphenylphosphino)ethane]dichloroiron(II), bis(pentamethylcyclopentadienyl)iron(II), bis(tetramethylcyclopentadienyl)iron(II), bromocyclopentadienyldicarbonyliron(II), cyclopentadienyldicarbonyl(methyl)iron(II), cyclopentadienyldicarbonyl(tetrahydrothran)iron(II) tetrafluoroborate, cyclopentadienyl(fluorene)iron(II) hexafluorophosphate, cyclopentadienyl iron(II) dicarbonyl dimer, decamethylferrocene, 1,1'-diacetylferrocene, dicarbonylcyclopentadienyliodoiron(II), diethylenetriaminepentaacetic acid iron(III) disodium salt hydrate, diironnonacarbonyl, 1,1'-dimethylferrocene, ethylenediaminetetraacetic acid ferric sodium salt, iron(III) citrate, ferrocene, ferrocenecarboxaldehyde, ferrocenecarboxylic acid, 1,1'-ferrocenedicarboxylic acid, ferrous sulfate heptahydrate, iron(II) acetate, iron(II) acetylacetonate, iron(III) acetylacetonate, (+)-iron (II)1-ascorbate, iron(II) bromide, iron(III) bromide, iron(II) chloride, iron(III) chloride, iron(III) ferrocyanide, iron(II) fluoride, iron(III) fluoride, iron(II)D-gluconate dihydrate, iron(II,III) oxide, iron(II) iodide, iron(II) lactate hydrate, iron nickel oxide, iron(III) nitrate nonahydrate, iron(II) oxalate dihydrate, iron(III) oxalate hexahydrate, iron(II) oxide, iron (III) oxide, iron(II) perchlorate hydrate, iron(III) perchlorate hydrate, iron(III) perchlorate hydrate, iron(III) phosphate, iron (III) pyrophosphate, iron(II) sulfate heptahydrate, iron (III) sulfate hydrate, iron(II) sulfide, iron(II) tetrafluoroborate hexahydrate, iron(III) p-toluenesulfonate hexahydrate, iron tris(2,2,6,6-tetramethyl-3,5-heptanedionate), (nicotinamidomethyl)phosphonic acid iron(II) salt, 2,3,7,8,12,13,17,18-octaethyl-21h,23h-porphine iron(III) acetate, 2,3,7,8,12,13,17,18-octaethyl-21h,23h-porphine iron(III) chloride, tetraethylammonium tetrachloroferrate(III), 5,10,15,20-tetralds(4-methoxyphenyl)-21h,23h-porphine iron(III) chloride, 5,10,15,20-tetralds(pentafluorophenyl)porphyrin iron (III) chloride, 5,10,15,20-tetrakis(pentafluorophenyl) porphyrin iron(III) chloride complex, meso-tetra(N-methyl-4-pyridyl)porphyrin iron, 5,10,15,20-tetraphenyl-21h,23h-porphine iron(III) chloride, meso-tetraphenylporphyrin iron (III) chloride complex, tricarbonyl(cyclooctatetraene)iron (II), tricarbonyl(2-methoxycyclohexadienylium) iron hexafluorophosphate, tricarbonyl(4-methoxy-1-methylcyclohexadienylium)iron tetrafluoroborate, triirondodecacarbonyl, tris(2,2'-bipyridine)iron(II) hexafluoro-phosphate, tris(ethylenediamine)iron(II) sulfate and others.

Suitable lead compounds include lead(II) phthalocyanine, lead(II) tetrakis(4-cumylphenoxy)phthalocyanine, acetoxytrimethyllead(IV), benzylchlorodiphenyllead, benzyltriphenyllead, benzyltri(p-tolyl)lead, (4-biphenylyl)triphenyllead, bis(4-chlorophenyl)dichlorolead, bis(4-chlorophenyl)diphenyllead, bis(4-(dimethylamino)phenyl)diphenyllead, bis-(2-ethylhexanoyloxy)diphenyllead, bis-(ethylthio)-lead, bis(2-furyl)diphenyllead, bis-(hexadecylthio)-lead (ii), bis-(methylthio)-lead, bis(2-thienyl)dichlorolead, bis(2-thienyl) diphenyllead, (4-bromobenzyptriphenyllead, (4-bromophenyl)triethyllead, (3-bromophenyl)triphenyllead, (4-bromophenyl)triphenyllead, bromotriethyllead, bromotrimethyllead(iv), bromotriphenyllead, (3-butenyl)dichloroethyllead, (3-butenyl)triethyllead, butyltriphenyllead, chlorodiphenyl(4-pentenyl)lead, (4-chlorophenyl)triphenyllead, chlorotricyclohexyllead, chlorotridodecyllead, chlorotrioctadecyllead, chlorotriphenyllead(iv), chlorotris(4-chlorophenyl)lead, chlorotris(4-methoxyphenyl)lead, cyanotriethyllead, dichlorodiethyllead, dichlorodiphenyllead, diethyldiphenyllead, diethyldithiocarbamic acid lead salt, diethyllead dibromide, diethyllead selenite, di(2-furyl) bis(4-methoxyphenyl)lead, diiododiphenyllead, di(1-naphthyl)diphenyllead, 2,4-dinitrobenzenesulfonic acid lead salt, diphenyldi(1-pyrrolyplead, diphenyldi(p-tolyl)lead, diphenyllead dibromide, (ethylthio)triphenyllead, ethyltriphenyllead, fluorotriphenyllead, (2-furyl)triphenyllead, 2-hexadecylsulfonyl-5-sulfobenzoic acid lead salt, hexaphenyldilead (iv), (4-(1-hydroxyethyl)phenyl)triphenyllead, (4-(2-hydroxyethyl)phenyl)triphenyllead, (2-(hydroxymethyl)phenyl)triphenyllead, (2-(hydroxymethyl)phenyl)triphenyllead, (3-(hydroxymethyl)phenyl)triphenyllead, (4-(hydroxymethyl)phenyl)triphenyllead, (2-hydroxyphenyl)triphenyllead, iodotricyclohexyllead, iodotriphenyllead, iodotris(mesityl)lead, isobutyltriphenyllead, lead(IV) acetate, lead(II) acetate basic, lead(II) acetylacetonate, lead(II) bromide, lead(II) carbonate, lead(II) carbonate basic, lead(II) chloride, lead(II) chromate, lead(II) citrate tribasic trihydrate, lead diethyldithiocarbamate, lead(II) fluoride, lead(II) 2-hydroxy-2-methylpropionate, lead(II) iodate, lead(II) iodide, lead(II) methanesulfonate, lead(II) nitrate, lead(II) oxide, lead(IV) oxide, lead(II) perchlorate hydrate, lead(II) Salicylate, lead subacetate, lead(II) sulfate, lead(II) sulfide, lead tetraacetate, lead(II) tetrafluoroborate, lead(II) thiocyanate, lead(II) trifluoroacetate, (2-methoxyphenyl)triphenyllead, (4-methoxyphenyl)triphenyllead, (4-methoxy-2,3,5,6-tetrafluorophenyl)triphenyllead, (methylthio)triphenyllead, lead(II,IV) oxide, (1-naphthyl)triphenyllead, 5-oxo-1-(4-sulfophenyl)-2-pyrazoline-3-carboxylic acid lead salt, paratolyltriacetoxylead, (pentachlorophenyl)triphenyllead, (pentafluorophenyl)triphenyllead, phenethyltriethyllead, (phenethyl)triphenyllead, (propylthio)-triphenyllead, propyltriphenyllead, sodium lead alloy, tert-butylchlorodiphenyllead, tert-butyltriphenyllead, tetraethyllead, tetrahexadecyllead, tetrakis(4-chlorophenyl)lead, tetrakis(4-(dimethylamino)phenyl)lead, tetrakis(4-ethoxyphenyl)lead, tetrakis(2-methoxyphenyl)lead, tetrakis(4-methoxyphenyl)lead, tetrakis(m-tolyl)lead, tetraphenyllead(iv), (thiophenoxy)triphenyllead, (p-tolyl)triphenyllead, tricyclohexyllead, triethyllead hydroxide, triethyl(triphenylmethyl)lead, trimesityllead, triphenyl(phenylethynyl)lead(iv), triphenyl(triphenylmethyl)lead, tris(2-ethoxyphenyl)lead, tris(4-ethoxyphenyl)lead, tris(1-naphthyl)lead, tris(1-pyrrolyplead, tri(o-tolyl)lead, tri(p-tolyl)lead and others.

Further examples are dilithium phthalocyanine, magnesium phthalocyanine, manganese(II) phthalocyanine, manganese(III) phthalocyanine chloride, manganese(III) phthalocyanine hydroxide and others.

Suitable nickel compounds include nickel(II) 5,9,14,18,23,27,32,36-octabutoxy-2,3-naphthalocyanine, nickel(II) 1,4,8,11,15,18,22,25-octabutoxy-29h,31h-phthalocyanine, nickel(II) phthalocyanine, nickel(II) phthalocyanine-tetrasulfonic acid tetrasodium salt, nickel(II) phthalocyanine-tetrasulfonic acid tetrasodium salt, nickel(II) 2,11,20,29-tetratert-butyl-2,3-naphthalocyanine, nickel(II) tetrakis(4-cumylphenoxy)phthalocyanine, nickel(II) 2,9,16,23-tetraphenoxy-29H,31H-phthalocyanine, (5,7,7,12,14,14-hexamethyl-1,4,8,11-tetraazacyclotetradeca-4,11-dienen-1-n-4-n-8-n-11)nickel(II) ClO4, allyl(cyclopentadienyl)nickel (II), ammonium nickel(II) sulfate hexahydrate, bis(cyclopentadienyOnickel(II), bis(1,3-diamino-2-propanopnickel(II) thiocyanate, bis(n,n-diethylethylenediamine)nickel(II) thiocyanate, bis[5-[[4-(dimethylamino)phenyl]imino]-8(5H)-quinolinone]nickel (II), bis(N,N-dimethyl-N'-5H-pyrido[2,3-c]phenothiazin-5-ylidene-1,4-phenylenediamine)nickel(II) diperchlorate, [1,2-bis(diphenylphosphino)ethane]dichloronickel(II), [1,1'-bis(diphenylphosphino)ferrocene]dichloronickel(II), (1,3-bis[diphenylphosphino]propane)dichloronickel(II), bis(ethylcyclopentadienyl)nickel(II), bis(ethylenediamine)nickel(II) chloride hydrate, bis(methylcyclopentadienyl)nickel(II), bis(pentamethylcyclopentadienyl)nickel(II), N,N-Bis(salicylidene)ethylenediaminonickel(II), bis(tetramethylcyclopentadienyl)nickel(II), bis(triphenylphosphine)nickel(II) dichloride, chloro(cyclopentadienyl)(triphenylphosphine)nickel(II), chloro(ethylcyclopentadienyl)(triphenylphosphinenickel(II), cyclopentadienylnickel(II) carbonyl dimer, dibromobis(tributylphosphine)nickel(II), dibromobis(triphenylphosphine)nickel(II), dichlorobis(tributylphosphine)nickel(II), dichlorobis(trimethylphosphine)nickel(II), dilithium tetrabromonickelate(II), hexaamminenickel(II) bromide, hexaamminenickel(II) iodide, hexaamminenickel(II) chloride, (5,7,7,12,14,14-hexamethyl1-4,8,11-tetraazacyclotetradecanen1-N-4-N-8-N-11)nickel(II) ClO$_4$, nickel(II) acetate tetrahydrate, nickel(II) acetylacetonate, nickel(II) bis(2,2,6,6-tetramethyl-3,5-heptanedionate), nickel boride, nickel(II) bromide, nickel(II) bromide-ethylene glycol dimethyl ether complex, nickel(II) bromide 2-methoxyethyl ether complex, nickel(II) carbonate basic hydrate, nickel(II) chloride, nickel(II) cyclohexanebutyrate, nickel(II) 2-ethylhexanoate, nickel(II) fluoride, nickel(II) hexafluoroacetylacetonate hydrate, nickel(II) hydroxide, nickel(II) iodide, nickel(II) nitrate hexahydrate, nickel(II) octanoate hydrate, nickel on silica/alumina, nickel(II) oxalate dihydrate, nickel(II) oxide, nickel(II) perchlorate hexahydrate, nickel(II) peroxide hydrate, nickel(II) phosphide, nickel(II) stearate, nickel(II) sulfamate tetrahydrate, nickel(II) sulfate heptahydrate, nickel sulfide, nickel(II) tetrafluoroborate solution, 2,3,7,8,12,13,17,18-Octaethyl-21h,23h-porphine nickel(II), potassium hexafluoronickelate(IV), potassium hexafluoronickelate (IV), potassium nickel(IV) paraperiodate, potassium tetracyanonickelate(II), tetrabutylammonium bis(3,6-dichloro-1,2-benzenedithiolato)nickelate, tetrabutylammonium bis(4-methyl-1,2-benzenedithiolato)nickelate, tetraethylammonium tetrachloronickelate(II), 5,10,15,20-tetraphenyl-21h,23h-porphine nickel(II), 2,2'-thiobis(4-tert-octylphenolato)-n-butylamine nickel(II), tris(ethylenediamine)nickel(II) chloride hydrate, tris(ethylenediamine) nickel(II) sulfate and others.

Suitable silicon compounds include methylsilicon(IV) phthalocyanine chloride, methylsilicon(IV) phthalocyanine hydroxide, silicon 2,3-naphthalocyanine bis(trihexylsilyloxide), silicon 2,3-naphthalocyanine dichloride, silicon 2,3-naphthalocyanine dihydroxide, silicon 2,3-naphthalocyanine dioctyloxide, silicon 2,3,9,10,16,17,23,24-octakis(octyloxy)-29h,31h-phthalocyanine dihydroxide, silicon(IV) phthalocyanine bis(trihexylsilyloxide), silicon phthalocyanine dichloride, silicon phthalocyanine dihydroxide, silicon 2,9,16,23-tetra-tert-butyl-29h,31h-phthalocyanine dihydroxide and others. Other phthalocyanines include silver phthalocyanine and disodium phthalocyanine.

Suitable tin compounds include tin(II) 2,3-naphthalocyanine, tin(IV) phthalocyanine oxide, tin(IV) 2,3-naphthalocyanine dichloride, tin(II) phthalocyanine, tin(IV) phthalocyanine dichloride, tin(II) fluoride, tin(II) sulfide and others.

Suitable titanium compounds include titanium(IV) phthalocyanine dichloride, titanyl phthalocyanine, titanium black and others.

Suitable vanadium compounds include vanadyl phthalocyanine compounds eg. vanadyl 2,11,20,29-tetra-tert-butyl-2,3-naphthalocyanine, vanadyl 3,10,17,24-tetra-tert-butyl-1,8,15,22-tetralds(dimethylamino)-29h,31h-phthalocyanine, vanadyl 2,9,16,23-tetraphenoxy-29h,31h-phthalocyanine, vanadyl 5,14,23,32-tetraphenyl-2,3-naphthalocyanine and others.

Suitable zinc compounds include zinc 1,2,3,4,8,9,10,11,15,16,17,18,22,23,24,25-hexadecafluoro-29h,31h-phthalocyanine, zinc 1,4,8,11,15,18,22,25-octabutoxy-29h,31h-phthalocyanine, zinc 2,3,9,10,16,17,23,24-octakis(octyloxy)-29h,31h-phthalocyanine, zinc phthalocyanine, zinc 2,11,20, 29-tetra-tert-butyl-2,3-naphthalocyanine, zinc 2,9,16,23-tetra-tert-butyl-29H,31H-phthalocyanine, zinc 2,9,16,23-tetrakis(phenylthio)-29h,31h-phthalocyanine, zinc(II) tetranitrophthalocyanine and others.

Suitable binary metal salts include copper zinc iron oxide, copper-zinc alloy, copper-tin alloy, zincaluminium$_4$copper$_1$, copper mercuric iodide, copper(I) tetraiodomercurate(I), copper iron oxide, copper aluminium oxide, copper chromite, copper(I) selenide, copper(II) selenide, copper(II) selenite dehydrate, copper niobate, copper(I) telluride, copper(II) telluride, titanium-copper alloy, yttrium aluminium oxide, yttrium barium copper oxide, yttrium barium copper hydroxy carbonate, yttrium barium copper oxide carbonate, silver-copper, bismuth lead strontium calcium copper oxide, bismuth strontium calcium copper oxide, copper (II) niobate, copper (II) selenite dihydrate, copper (II) selenate pentahydrate, magnesium aluminium oxide, lanthanum aluminium oxide, barium ferrite, iron(II) titanate, lithium iron(III) oxide, nickel zinc iron oxide, yttrium iron oxide, aluminium-nickel alloy, nickel chromium oxide, nickel cobalt oxide, zirconium-nickel alloy, bismuth cobalt zinc oxide, cobalt(II) selenide, lithium cobalt(III) oxide, nickel cobalt oxide, bismuth lead strontium calcium copper oxide, lead(II) niobate, lead(II) selenide, lead(II) tantalate, lead(II) telluride, lead(II) titanate, lead(II) zirconate, silver chromium oxide, cobalt aluminium oxide, antimony(III) selenide, antimony tin oxide, indium tin oxide, strontium titanate, strontium zirconate, bismuth aluminium oxide bismuth zirconate, bismuth titanium oxide, bismuth oxide, neodymium oxide, neodymium(III) titanate, lithium niobate and others.

Suitable binary metal salts for dual purpose near-IR absorbing and laser marking include copper (II) molybenum oxide, copper (II) tungsten oxide, copper (II) vanadium oxide, silver molybdenum oxide, silver tungsten oxide, potassium molybdate, sodium molybdate dihydrate, strontium molybdate, zinc molybdate, barium molybdate, bismuth(III) molybdate, cadmium molybdate, calcium molybdate, lead (II) molybdate, lithium molybdate, magnesium molybdate, manganese(II) molybdate, cadmium tungstate, calcium tungstate, cerium(III) tungstate, cesium tungstate, lead(II) tungstate, lithium tungstate, magnesium tungstate, sodium polytungstate, sodium tungstate dihydrate, cesium metavanadate, cesium orthovanadate, sodium metavanadate, sodium pyrovanadate, sodium orthovanadate, potassium metavanadate, yttrium vanadate, silver metavanadate, magnesium tungsten oxide, potassium tungsten oxide, magnesium vanadium oxide, barium calcium tungsten oxide, barium strontium tungsten oxide, barium yttrium tungsten oxide, nickel(II) molybdate, barium tungstate, nickel(II) molybdate, lead(II) metavanadate, lead(II) molybdate, lead(II) tungstate, bismuth iron molybdenum oxide, bismuth tungsten oxide, bismuth antimonide, wulfenite, powellite and others.

The above binary metal salts can also be used as near-IR absorbers in combination with other laser marking materials such as AOM.

Suitable metal salts for laser marking include molybdenum (VI), tungsten (VI), vanadium (VI) antimony (V) and iron compounds. Examples are ammonium molybdate tetrahydrate, ammonium octamolybdate, ammonium polymolybdate, ammonium decamolybdate, ammonium heptamolybdate, silicomolybdic acid hydrate, ammonium silicomolybdic acid, sodium phosphomolybdate hydrate, ammonium phosphomolybdate hydrate, phosphomolybdic acid hydrate, ammonium tetrathiomolybdate, bis(acetylacetonato)dioxomolybdenum(VI), bis(diethyldithiocarbamato)dioxomolybdenum(VI), dicarbonyl(pentamethylcyclopentadienyl)molybdenum(V) dimer, 2,6-diisopropylphenylimido-neophylidene[(s)-()-biphen] molybdenum(VI), molybdenum(VI) dichloride dioxide, molybdenum disilicide, molybdenum(VI) fluoride, molybdenum(VI) oxide, molybdenum(VI) tetrachloride oxide, molybdic acid, tungstic acid, silicotungstic acid, ammonium silicotungstic acid, ammonium metatungstate hydrate, ammonium (para)tungstate, ammonium tetrathiotungstate, hydrogentungstate, polymer-supported, bis(tert-butylimino)bis(dimethylamino) tungsten(VI), phosphotungstic acid hydrate, piperidine tetrathiotungstate, tngsten(VI) chloride, tungsten(VI) dichloride dioxide, tungsten(VI) fluoride, tungsten(IV) oxide, tungsten(VI) oxychloride, tungstosilicic acid hydrate, ammonium metavanadate, ammonium polyvanadate sodium metavanadate, antimony(V) oxide, tetraphenylantimony(V) acetate, tetraphenylantimony(V) bromide antimony(V) sulphide, yellow iron oxide, red iron oxide and others.

Suitable oxy metal salt complexes for laser marking include Mo(VI), W(VI) and V(VI) compounds.

Examples are tetra(bis(2-ethylhexylamine))octamolybdate, tetra(dicyclohexylamine)octamolybdate, tetra(bis(2-ethylhexylamine))octatungstate, tetra(dicyclohexylamine)octatungstate, tetra(bis(2-ethylhexylamine))octavanadate, and tetra(dicyclohexylamine)octavanadate.

Other than the metal salt, compositions of and for use in the present invention may comprise materials of the type described in the publications identified above. In one particular embodiment of the invention, when a poly-metal salt is used in combination with an additional marking component, then a composite colour can be achieved. The marking component may be one or more of a range of materials such as, for example, dye precursor, colour developer+dye precursor, oxy metal salt, oxy metal salt+dye precursor, oxy metal complex, or oxy metal complex+dye precursor. Other suitable components include pigment precursors. Any of all such components may be polymeric or halogenated; cellulosic materials or sugars may also be used. Examples of charrable polymers and sugars are polyvinyl alcohol, carboxymethylcellulose, hydroxypropylcellulose, fructose, glucose, sucrose and starch.

All such active materials described above can be supported on inert materials such as alumina, titanium oxide, zinc oxide, kaolin or mica.

A preferred marking component for use in the invention is a compound including an oxymetal anion. In combination with a salt, this typically allows marking with a diode or $CO_2$ laser. A suitable oxymetal anion component may be one or more of a range of materials, for example, ammonium octamolybdate, bis[2-(ethylhexylamine)]molybdate or di(cyclohexylamine)molybdate. A suitable ink formulation comprises 10-50% w/w of this component.

A colour-forming component may be included. Such materials are well known to those of ordinary skill in the art. Examples of suitable colour-formers include one or more of a range of conventional materials such as electron-donating materials, e.g. phthalides, fluorans and leuco dyes, for example crystal violet lactone. Lewis acids, whether electron-accepting or acid-generating, may also be used; examples are hydroxybenzoate, bisphenol A, zinc stearate and others.

Compositions for use in the invention can be produced in solvent, non-solvent and solvent-less binder systems such as Tampoprinting inks, UV-curing inks etc. A suitable binder, which may be water-soluble, alkali-soluble or an emulsion polymer, examples being polyvinyl alcohol (as available as Gohsenol GH-17), acrylic emulsion (as available from Scott Bader as Texicryl 13-011), materials available as Ineos Elvacite 2013, 2028, 2043 or 30, polyvinyl butyral (available as Pioloform) and nitrocellulose, e.g. in an amount of 10-50% w/w.

Pigments such as fumed silica or zinc stearate may also be used, e.g. in an amount of 10-50% w/w. Other materials that may be used include any one or more of antioxidants, reducing agents, lubricating agents, surfactants, pigments, sensitizers and defoamers.

When formulated as an ink for use in the invention, e.g. as a solution, dispension or suspension, a suitable carrier liquid or solvent may be aqueous or organic, and other components will be chosen accordingly. For example, the liquid may be or comprise water or an organic solvent such as isopropanol, methyl ethyl ketone, ethanol or ethyl acetate, optionally with amine and/or surfactant, e.g. in an amount of 20-80% w/w. Compositions may be prepared by dispersion of components in water-based polymer binder solutions such as polyvinyl alcohol and film-forming emulsions such as acrylics. These compositions may be produced by using:
  a) mechanical mixing, e.g. leading edge-trailing blade stirring
  b) ceramic ball grinding and milling
  c) silverson mixing
  d) glass bead mechanical milling, e.g. in an Eiger Torrance motormill
  e) Ultra Turrax homogeniser
  f) mortar and pestle grinding In order to illustrate the invention, copper salts have been initially evaluated at suitable concentrations using a range of appropriate ink formulations with inherent but chemically different colour change capabilities and characteristics. When coating onto various substrates, laser imaging at near-IR wavelengths (700-2000 nm) has been achieved.

By application of liquid film-forming inks onto various substrates, coatings capable of distinct colour change can be produced. Exposure to near-IR sources can produce dramatically different results, dependent primarily on the formulation of the ink.

Due to the remarkable character of the ink/coatings in producing a black image on exposure to diode laser wavelengths, e.g. when including a copper salt and an oxymetal anion, this may be further exploited by differentiating between activating sources. Further, due to the remarkable character of the ink/coatings in producing a coloured image on exposure to diode laser wavelengths when including copper salt and a colour-forming component, this may be further exploited by differentiation between activating sources and to produce a range of different colours.

A composition of or for use in the invention can be used to produce an IR-sensitive coating that can be applied by a range of methods such as flood-coating, flexo/gravure etc. The coating can be applied to a range of substrates such as paper, paperboard, flexible plastic film, corrugate board etc.

Potential further media for the invention are UV-curable flexographic inks, UV-curable offset inks, conventional offset inks, melt-extrudable polymer and powder coatings.

The following Examples illustrate the invention. The following abbreviations are used:
  CHP—copper (II) Hydroxy Phosphate
  CPPH—copper (II) Pyrophosphate Hydrate
  CMO—copper (II) Molybdenum Oxide
  CTO—copper (II) Tungsten Oxide
  CCB—copper Carbonate Basic
  COH—copper Oxalate Hemihydrate
  CAH—copper Acetate Hydrate
  CAA—copper AcetylAcetonate
  CDGT—copper D-Gluconate Tetrahydrate
  CFT—copper Formate Tetrahydrate
  AOM—ammonium OctaMolybdate
  CMC—CarboxyMethyl Cellulose
  CG—Cellulose Gum
  HPC—Hydroxy Propyl Cellulose

EXAMPLE 1

Water-based inks of a PVOH solution-stabilised dispersion in acrylic emulsion, comprising a near IR-absorber and an oxymetal salt, have been evaluated. Strong, well-defined and distinct colour changes have been demonstrated with diode (~830 nm) and $CO_2$ (~10,000 nm) lasers when the inks are applied with 1 or 2×K-bar 2.5 on different substrates, i.e. paper, board or foil, and subjected to hot-air drying.

The composition (each component amount given in % w/w) and results are given in Tables 1a to 1e.

TABLE 1A

| | | | |
|---|---|---|---|
| Texicryl 13-011 | 40 | 25 | 23 |
| Gohsenol GH-17 | — | 1 | 1 |
| AOM | — | 27 | 24 |
| CHP | 5 | — | 6 |
| Water | 55 | 47 | 46 |
| Unimaged | Off-white/green | White | Off-white/green |
| Exposed (~830 nm) | Burning | None | Black |
| Exposed (~10,000 nm) | Burning | Black | Black |

TABLE 1b

| | |
|---|---|
| Texicryl 13-011 (% nv) | 26 |
| Gohsenol GH-17 | 1 |
| AOM | 27 |
| CPPH | 6 |
| Water etc. | 40 |
| Unimaged | Off-White Blue |
| Exposed (~830 nm) | Black |
| Exposed (10,000 nm) | Black |

TABLE 1c

| | | | |
|---|---|---|---|
| Texicryl 13-567 (% nv) | 30 | 30 | 30 |
| Ammonia | 3 | 3 | 3 |
| Gohsenol GH-17 | 1 | 1 | 1 |
| AOM | 20 | 15 | 10 |
| CHP | 20 | 20 | 20 |
| Water etc. | 26 | 31 | 36 |
| Unimaged | Off-White Green | Off-White Green | Off-White Green |
| Exposed (~830 nm) | Black | Black | Black |
| Exposed (10,000 nm) | Black | Black | Black |

TABLE 1d

| | | | | |
|---|---|---|---|---|
| Texicryl 13-567 (% nv) | 32 | 32 | 32 | 32 |
| Ammonia | 5 | 5 | 5 | 5 |
| Gohsenol GH-17 | 1 | 1 | 1 | 1 |
| AOM | 13 | 13 | 13 | 13 |
| CHP | 21 | — | — | — |
| CPPH | — | 21 | — | — |
| CCB | — | — | 21 | — |
| COH | — | — | — | 21 |
| Water etc. | 28 | 28 | 28 | 28 |
| Unimaged | Off-White Green | Off-White Blue | Off-White Green | Off-White Pale Blue |
| Exposed (~830 nm) | Black | Black | Black | Black |
| Exposed (10,000 nm) | Black | Black | Black | Black |

TABLE 1e

| Texicryl 13-567 (% nv) | 32 | 32 | 32 | 32 |
|---|---|---|---|---|
| Ammonia | 5 | 5 | 5 | 5 |
| Gohsenol GH-17 | 1 | 1 | 1 | 1 |
| AOM | 13 | 13 | 13 | 13 |
| CAH | 21 | — | — | — |
| CAA | — | 21 | — | — |
| CDGT | — | — | 21 | — |
| CFT | — | — | — | 21 |
| Water etc. | 28 | 28 | 28 | 28 |
| Unimaged | Off-White Blue Green | Off-White Purple | Off-White Pale Blue | Off-White Blue Green |
| Exposed (~830 nm) | Black | Black | Black | Black |
| Exposed (10,000 nm) | Black | Black | Black | Black |

EXAMPLE 2

Solvent-based inks of a stabilised dispersion in acrylic, alcohol/ester solution, comprising a near IR-absorber and an oxymetal salt but no conventional colour-former) have been evaluated. Strong, well-defined and distinct colour changes have been demonstrated with the diode and $CO_2$ lasers when applied by K-bar on different substrates, as in Example 1.

The compositions (% w/w) and results are given in Table 2.

TABLE 2

| Elvacite 2028 | 26 | 19 | 18 |
|---|---|---|---|
| CHP | 5 | — | 5 |
| AOM | — | 22 | 21 |
| Fumed Silica | — | 1 | 1 |
| Ethanol | 69 | 58 | 55 |
| Unimaged | Off-white/green | White | Off/white/green |
| Exposed (~830 nm) | Burning | None | Black |
| Exposed (~10,000 nm) | Slight burning | Black | Black |

EXAMPLE 3

Water-based inks comprising a near IR-absorber and an organic pigment precursor, i.e. dispersed Pergascript colour-formers Blue I2RN, Blue SRB-P and Red I6B in acrylic emulsion, have been evaluated. Strong, well-defined and distinct colour changes have been demonstrated with diode and $CO_2$ lasers when applied by K-bar on different substrates, as in Example 1.

The composition (% w/w) and results are given in Table 3.

TABLE 3

| Texicryl 13-011 | 40 | 40 | 40 | 38 | 38 | 38 | 38 |
|---|---|---|---|---|---|---|---|
| Pergascript Red 16B | — | 5 | — | — | 5 | — | 5 |
| Pergascript Blue SRB-P | — | — | 5 | 5 | — | 5 | — |
| CHP | 5 | — | — | 5 | 5 | — | — |
| CPPH | — | — | — | — | — | 5 | 5 |
| Water | 55 | 55 | 55 | 52 | 52 | 52 | 52 |
| Unimaged | Off-white/green | Off-white | Off-white | Off-white/Green | Off-white/green | Off-white/green | Off-white/green |
| Exposed (~820 nm) | Burning | None | None | Pink/purple | Blue | Pink/purple | Blue |
| Exposed (~10,000 nm) | Slight burning | Weak pink/purple | Weak blue | Pink/purple | Blue | Pink/purple | Blue |

EXAMPLE 4

Water-based inks of a binary metal salt (that is a near IR-absorber and oxymetal salt) in PVOH solution-stabilised dispersion in acrylic emulsion have been evaluated. Strong, well-defined and distinct colour changes have been demonstrated with diode and $CO_2$ lasers when the inks are applied with 1 or 2×K-bar 2.5 on different substrates, as in Example 1.

The composition (each component amount given in % w/w) and results are given in Tables 4a and 4b.

TABLE 4a

| Texicryl 13-011 | 38 | 38 |
|---|---|---|
| CMO | 10 | — |
| CTO | — | 10 |
| Water | 52 | 52 |
| Unimaged | Green | Green/yellow |
| Exposed (~900 nm) | Black/brown | Brown |
| Exposed (10,000 nm) | Black/brown | Brown |

TABLE 4b

| Texicryl 13-011 (% nv) | 38 |
|---|---|
| ZMO | 10 |
| Water etc. | 52 |
| Unimaged | Grey/Brown |
| Exposed (~830 nm) | None |
| Exposed (10,000 nm) | Black/brown |

EXAMPLE 5

This Example illustrates a N-IR absorber in combination with organic pigment precursor and Lewis acid.

TABLE 5

| Texicryl 13-567 (% nv) | 14.9 | 14.9 | 14.9 |
|---|---|---|---|
| Gohsenol GH-17 | 1 | 1 | 1 |
| CHP | 13.7 | 13.7 | 13.7 |
| BHB | 9.1 | 9.1 | 9.1 |
| Pergascript Red I-6B | 4.6 | — | — |
| Pergascript Blue I-2RN | — | 4.6 | — |
| Pergascript Black IR | — | — | 4.6 |
| Water etc. | 56.7 | 56.7 | 56.7 |
| Unimaged | Off-White Green | Off-White Green | Off-White Green |
| Exposed (~830 nm) | Purple | Blue | Black |
| Exposed (10,000 nm) | Purple | Blue | Black |

EXAMPLE 6

This Example illustrates a N-IR absorber in combination with organic pigment precursor and Lewis acid and oxy metal salt.

TABLE 6

| | | | |
|---|---|---|---|
| Texicryl 13-567 (% nv) | 13.7 | 13.7 | 13.7 |
| Ammonia | 2.2 | 2.2 | 2.2 |
| Gohsenol GH-17 | 1 | 1 | 1 |
| CHP | 11.9 | 11.9 | 11.9 |
| BHB | 7.9 | 7.9 | 7.9 |
| Pergascript Red I-6B | 4.0 | — | — |
| Pergascript Blue I-2RN | — | 4.0 | — |
| Pergascript Black IR | — | — | 4.0 |
| AOM | 6.0 | 6.0 | 6.0 |
| Water | 53.3 | 53.3 | 53.3 |
| Unimaged | Off-White Green | Off-White Green | Off-White Green |
| Exposed (~830 nm) | Dark Purple | Dark Blue | Dark Black |
| Exposed (10,000 nm) | Dark Purple | Dark Blue | Dark Black |

EXAMPLE 7

This Example illustrates N-IR absorber in combination with inorganic pigment precursor.

TABLE 7

| | |
|---|---|
| Texicryl 13-567 (% nv) | 21.7 |
| CHP | 20.8 |
| Yellow iron Oxide | 10.4 |
| Water | 47.1 |
| Unimaged | Yellow Mustard |
| Exposed (~830 nm) | Red Brown |
| Exposed (10,000 nm) | Red Brown |

EXAMPLE 8

This Example illustrates a N-IR absorber in combination with functional hydroxylated or chlorinated polymer.

TABLE 8a

| | | | | |
|---|---|---|---|---|
| CMC | 16.0 | — | — | — |
| CG | — | 4.4 | — | — |
| HPC | — | — | 10.0 | — |
| Starch | — | — | — | 10.0 |
| CHP | 20.0 | 16.6 | 20.0 | 20.0 |
| Water | 64.0 | 79.0 | 70.0 | 70.0 |
| Unimaged | Off-White Green | Off-White Green | Off-White Green | Off-White Green |
| Exposed (~830 nm) | Dark Brown | Dark Brown | Dark Brown | Dark Brown |
| Exposed (10,000 nm) | Dark Brown | Dark Brown | Dark Brown | Dark Brown |

TABLE 8b

| | | |
|---|---|---|
| Polidene 33-065 (% nv) | 45 | — |
| Polidene 33-004 (% nv) | — | 37.5 |
| CHP | 25 | 25 |
| Water | 30 | 37.5 |
| Unimaged | Green Cream | Green Cream |
| Exposed (~830 nm) | Dark Brown | Dark Brown |
| Exposed (10,000 nm) | Dark Brown | Dark Brown |

EXAMPLE 9

This example illustrates N-IR. absorber in combination with functional hydroxylated sugar.

TABLE 9

| | | | |
|---|---|---|---|
| Texicryl 13-567 (% nv) | 21.7 | 21.7 | 21.7 |
| D(−)-Fructose | 20.8 | — | — |
| D-(+)-Glucose | — | 20.8 | — |
| D-(+)-Saccharose | — | — | 20.8 |
| CHP | 20.8 | 20.8 | 20.8 |
| Water | 36.7 | 36.7 | 36.7 |
| Unimaged | Off-White Green | Off-White Green | Off-White Green |
| Exposed (~830 nm) | Dark Brown | Dark Brown | Dark Brown |
| Exposed (10,000 nm) | Dark Brown | Dark Brown | Dark Brown |

The invention claimed is:

1. A method for forming an image on a substrate, which comprises applying onto the substrate an ink formulation comprising a copper salt that absorbs laser irradiation at 700-2000 nm and a marking component that can undergo a colour-forming reaction, wherein the marking component is a compound including an oxymetal anion; wherein said method further comprises irradiating the ink formulation with a laser at 700-2000 nm, thereby causing the marking component to change colour.

2. The method according to claim 1, wherein the marking component is ammonium octamolybdate.

3. The method according to claim 1, wherein the copper salt is a poly-metal salt.

4. The method according to claim 1, wherein the copper salt is copper (II) hydroxyl phosphate.

5. The method according to claim 1, wherein the ink formulation further comprises a binder.

6. The method according to claim 1, wherein the ink formulation is water-based.

7. The method according to claim 1, wherein the ink formulation further comprises an organic solvent.

* * * * *